US012646474B2

(12) United States Patent
Kim et al.

(10) Patent No.: US 12,646,474 B2
(45) Date of Patent: Jun. 2, 2026

(54) DISPLAY DEVICE AND CONTROL METHOD THEREOF

(71) Applicant: Samsung Electronics Co., Ltd., Suwon-si (KR)

(72) Inventors: Doyoung Kim, Suwon-si (KR); Jaewook Han, Suwon-si (KR); Min Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/668,943

(22) Filed: May 20, 2024

(65) Prior Publication Data

US 2024/0304156 A1 Sep. 12, 2024

Related U.S. Application Data

(63) Continuation of application No. PCT/KR2022/018612, filed on Nov. 23, 2022.

(30) Foreign Application Priority Data

Nov. 23, 2021 (KR) ........................ 10-2021-0162534

(51) Int. Cl.
*G09G 3/34* (2006.01)
*G09G 3/32* (2016.01)

(52) U.S. Cl.
CPC ............. *G09G 3/3413* (2013.01); *G09G 3/32* (2013.01); *G09G 2300/0842* (2013.01); (Continued)

(58) Field of Classification Search
None
See application file for complete search history.

(56) References Cited

U.S. PATENT DOCUMENTS 8,610,738 B2 12/2013 Choe et al.
9,792,878 B2 10/2017 Yoon et al.
(Continued)

FOREIGN PATENT DOCUMENTS

KR 100706521 B1 4/2007
KR 10-2007-0086826 A 8/2007
(Continued)

OTHER PUBLICATIONS

International Search Report for PCT/KR2022/018612 mailed Feb. 22, 2023, 4 pages.
(Continued)

*Primary Examiner* — Andre L Matthews
(74) *Attorney, Agent, or Firm* — NIXON & VANDERHYE P.C.

(57) ABSTRACT

A display device is disclosed. The display device includes: a display, a sensor, a plurality of light emitting diodes (LEDs) provided in one region of the display and emitting light in different colors, and at least one processor, comprising processing circuitry. At least one processor, individually and/or collectively, according to an example can identify at least one of color information and brightness information corresponding to the plurality of LEDs, on the basis of RGB grayscale data of a pixel corresponding to a specified region of interest, from an image provided through the display, obtain ambient information, on the basis of sensing data obtained through the sensor, modify the identified information on the basis of the ambient environment information, and control light-emitting states of the plurality of LEDs on the basis of the modified information.

10 Claims, 12 Drawing Sheets

(52) U.S. Cl.
CPC ............... *G09G 2320/0271* (2013.01); *G09G 2320/062* (2013.01); *G09G 2320/0626* (2013.01); *G09G 2360/144* (2013.01)

(56) References Cited

U.S. PATENT DOCUMENTS

| | | | | |
|---|---|---|---|---|
| 10,492,274 | B2 | 11/2019 | De Bruijn et al. | |
| 10,504,487 | B2 | 12/2019 | Jung et al. | |
| 2003/0135288 | A1* | 7/2003 | Ranganathan | G06F 1/3203 700/79 |
| 2007/0222730 | A1* | 9/2007 | Kao | G09G 3/2059 345/89 |
| 2009/0225065 | A1 | 9/2009 | Overes | |
| 2010/0034425 | A1 | 2/2010 | Lin et al. | |
| 2010/0060172 | A1* | 3/2010 | Ikebe | H05B 45/00 315/152 |
| 2013/0100097 | A1 | 4/2013 | Martin | |
| 2016/0133227 | A1* | 5/2016 | Yoon | G09G 3/14 345/593 |
| 2020/0279541 | A1 | 9/2020 | Pantfoerder | |
| 2021/0174751 | A1* | 6/2021 | Stuppi | G09G 3/3406 |
| 2021/0327393 | A1* | 10/2021 | Ikebe | H05B 45/00 315/152 |
| 2024/0078967 | A1* | 3/2024 | Lee | G09G 3/32 |

FOREIGN PATENT DOCUMENTS

| | | | |
|---|---|---|---|
| KR | 20090086951 | A | 8/2009 |
| KR | 20140091709 | A | 7/2014 |
| KR | 101520069 | B1 | 5/2015 |
| KR | 10-2016-0055534 | A | 5/2016 |
| KR | 20160144253 | A | 12/2016 |
| KR | 102046491 | B1 | 11/2019 |
| KR | 20210009609 | A | 1/2021 |
| KR | 102246762 | B1 | 4/2021 |
| KR | 20210094956 | A | 7/2021 |
| WO | 2006003624 | A1 | 1/2006 |

OTHER PUBLICATIONS

Written Opinion of the ISA for PCT/KR2022/018612 mailed Feb. 22, 2023, 4 pages.

Extended European Search Report dated Apr. 14, 2025 for EP Application No. 22899025.5.

Korean Office Action dated Apr. 9, 2025 for KR Application No. 10-2021-0162534.

Partial Supplementary European Search Report dated Jan. 24, 2025 for EP Application No. 22899025.5.

Office Action for KR Application No. 10-2021-0162534 dated Dec. 18, 2025 and English translation, 9 pages.

* cited by examiner

DISPLAY DEVICE AND CONTROL METHOD THEREOF

CROSS-REFERENCE TO RELATED APPLICATIONS

This application is a continuation of International Application No. PCT/KR2022/018612 designating the United States, filed on Nov. 23, 2022, in the Korean Intellectual Property Receiving Office and claiming priority to Korean Patent Application No. 10-2021-0162534, filed on Nov. 23, 2021, in the Korean Intellectual Property Office, the disclosures of each of which are incorporated by reference herein in their entireties.

BACKGROUND

Field

The disclosure relates to a display device and a control method thereof, and for example, to a display device that provides a lighting effect associated with content provided to a user and a control method thereof.

Description of Related Art

Recently, display devices including LEDs which are disposed at a side surface or a back surface of the device and emit light in various colors are being supplied. The display device described above may emit light of a main color (ambient light) perceived by a user through content and increase a sense of immersion of the user content.

However, the display device of the related art failed to consider visual sensitivity characteristics of the user which is determined by illuminance, color temperature, and the like of a space in which the user is positioned and has a problem of not being able to provide a satisfactory lighting effect to the user. Accordingly, there has been a continuous demand or a method of providing lighting effect taking into consideration the visual sensitivity characteristics of the user.

SUMMARY

Embodiments of the disclosure provide a display device which modifies color or brightness information corresponding to a plurality of LEDs based on surrounding environment information, and provides a lighting effect based on the modification result and a control method thereof.

According to an example embodiment of the disclosure, a display device includes: a display, a sensor, a plurality of light emitting diodes (LEDs) provided at one region of the display and configured to emit light in different colors, and at least one processor, comprising processing circuitry, individually and/or collectively, configured to: identify at least one from among color information or brightness information corresponding to the plurality of LEDs based on RGB grayscale data of pixels corresponding to a specified region of interest from an image provided through the display, obtain surrounding environment information based on sensing data obtained through the sensor, modify the identified information based on the surrounding environment information, and control a light emitting state of the plurality of LEDs based on the modified information.

The sensor may include an illuminance sensor, and at least one processor, individually and/or collectively, may be configured to: modify brightness information corresponding to the plurality of LEDs based on surrounding brightness information obtained by the illuminance sensor, and control the light emitting state of the plurality of LEDs based on the modified brightness information.

At least one processor, individually and/or collectively, may be configured to: obtain a gain value proportionate to the obtained surrounding brightness information, and modify brightness information by applying the obtained gain value to the brightness information corresponding to the plurality of LEDs.

At least one processor, individually and/or collectively, may be configured to: obtain, based on the obtained surrounding brightness information being identified as less than or equal to a first threshold value, a gain value for reducing brightness corresponding to the plurality of LEDs, and modify brightness information by applying the obtained gain value to the brightness information corresponding to the plurality of LEDs.

At least one processor, individually and/or collectively, may be configured to: obtain, based on the obtained surrounding brightness information being identified as greater than or equal to a second threshold value, a gain value for increasing brightness corresponding to the plurality of LEDs, and modify brightness information by applying the obtained gain value to the brightness information corresponding to the plurality of LEDs.

The sensor may include a color sensor, and at least one processor, individually and/or collectively, may be configured to: modify color information corresponding to the plurality of LEDs based on surrounding color information obtained by the color sensor, and control the light emitting state of the plurality of LEDs based on the modified color information.

At least one processor, individually and/or collectively, may be configured to: modify color information corresponding to the plurality of LEDs based on a specified lighting mode and the surrounding color information, and control the light emitting state of the plurality of LEDs based on the modified color information.

The specified lighting mode may be determined based on at least one from among a user command, a use history, or type of the image, and include at least one from among a contrast color mode or a similar color mode.

At least one processor, individually and/or collectively, may be configured to: in the contrast color mode, increase, based on a grayscale value of a specific color included in the surrounding color information being relatively lower than grayscale values of remaining colors, the grayscale value of the specific color corresponding to the plurality of LEDs, and reduce, based on the grayscale value of the specific color included in the surrounding color information being relatively higher than the grayscale values of the remaining colors, the grayscale value of the specific color corresponding to the plurality of LEDs.

At least one processor, individually and/or collectively, may be configured to: in the similar color mode, reduce, based on a grayscale value of a specific color included in the surrounding color information being relatively lower than grayscale values of remaining colors, the grayscale value of the specific color corresponding to the plurality of LEDs, and increase, based on the grayscale value of the specific color included in the surrounding color information being relatively higher than the grayscale values of the remaining colors, the grayscale value of the specific color corresponding to the plurality of LEDs.

The display device may further include a memory which stores information on regions of interest for each content type, and at least one processor, individually and/or collectively, may be configured to: set, based on information associated with the content type being selected, a region of interest corresponding to the selected content type based on the information stored in the memory.

The information on regions of interest for each content type may include information on different positions in an image for each content type, and the different positions in the image may include at least one from among a center region, a left lower end region, or a right lower end region of the image.

According to an example embodiment of the disclosure, a method of controlling a display device including a plurality of light emitting diodes (LEDs) configured to emit light in different colors includes: identifying at least one from among color information or brightness information corresponding to the plurality of LEDs based on RGB grayscale data of pixels corresponding to a specified region of interest from an image provided through a display, obtaining surrounding environment information based on sensing data obtained through a sensor, modifying the identified information based on the surrounding environment information, and driving the plurality of LEDs based on the modified information.

The modifying may include: modifying brightness information corresponding to the plurality of LEDs based on surrounding brightness information obtained by an illuminance sensor, and the driving the plurality of LEDs may include driving the plurality of LEDs based on the modified brightness information.

The modifying may include: obtaining a gain value proportionate to the obtained surrounding brightness information, and modifying brightness information by applying the obtained gain value to the brightness information corresponding to the plurality of LEDs.

The modifying may include: obtaining, based on the obtained surrounding brightness information being identified as less than or equal to a first threshold value, a gain value for reducing brightness corresponding to the plurality of LEDs, and modifying brightness information by applying the obtained gain value to the brightness information corresponding to the plurality of LEDs.

The modifying may include: obtaining, based on the obtained surrounding brightness information being identified as greater than or equal to a second threshold value, a gain value for increasing brightness corresponding to the plurality of LEDs, and modifying brightness information by applying the obtained gain value to the brightness information corresponding to the plurality of LEDs.

The modifying may include: modifying color information corresponding to the plurality of LEDs based on surrounding color information obtained by a color sensor, and the driving the plurality of LEDs may include driving the plurality of LEDs based on the modified color information.

The modifying may include: modifying color information corresponding to the plurality of LEDs based on a specified lighting mode and the surrounding color information, and the driving the plurality of LEDs may include driving the plurality of LEDs based on the modified color information.

The specified lighting mode may be determined based on at least one from among a user command, a use history, or type of the image, and include at least one from among a contrast color mode or a similar color mode.

The modifying may include: in the contrast color mode, increasing, based on a grayscale value of a specific color included in the surrounding color information being relatively lower than grayscale values of remaining colors, the grayscale value of the specific color corresponding to the plurality of LEDs, and reducing, based on the grayscale value of the specific color included in the surrounding color information being relatively higher than the grayscale values of the remaining colors, the grayscale value of the specific color corresponding to the plurality of LEDs.

The modifying may include: in the similar color mode, reducing, based on a grayscale value of a specific color included in the surrounding color information being relatively lower than grayscale values of remaining colors, the grayscale value of the specific color corresponding to the plurality of LEDs, and increasing, based on the grayscale value of the specific color included in the surrounding color information being relatively higher than the grayscale values of the remaining colors, the grayscale value of the specific color corresponding to the plurality of LEDs.

The identifying at least one from among color information or brightness information may include: setting, based on information associated with the content type being selected, a region of interest corresponding to the selected content type based on information on regions of interest for each content type.

The information on regions of interest for each content type may include information on different positions in an image for each content type, and the different positions in the image may include at least one from among a center region, a left lower end region, or a right lower end region of the image.

According to various example embodiments of the disclosure, because the display device is able to provide a lighting effect taking into consideration visual sensitivity characteristics of a user, a sense of immersion may increase for content which is provided together with the lighting effect.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The disclosure will be described in greater detail below with reference to the accompanying drawings.

Terms used in describing various example embodiments of the disclosure are general terms selected that are currently widely used considering their function herein. However, the terms may change depending on intention, legal or technical interpretation, emergence of new technologies, and the like of those skilled in the related art. Further, in certain cases, there may be terms that are arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," and "may include" are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B".

Expressions such as "1st", "2nd", "first" or "second" used in the disclosure may limit various elements regardless of order and/or importance, and may be used merely to distinguish one element from another element and not limit the relevant element.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the disclosure may perform at least one function or operation, and may be implemented with a hardware or software, or implemented with a combination of hardware and software. In addition, a plurality of "modules" or a plurality of "parts," except for a "module" or a "part" which needs to be implemented to a specific hardware, may be integrated in at least one module and implemented as at least one processor (not shown).

In the disclosure, a 'user' may refer, for example, to a person who receives content through a display device, but is not limited thereto.

Figure 1:
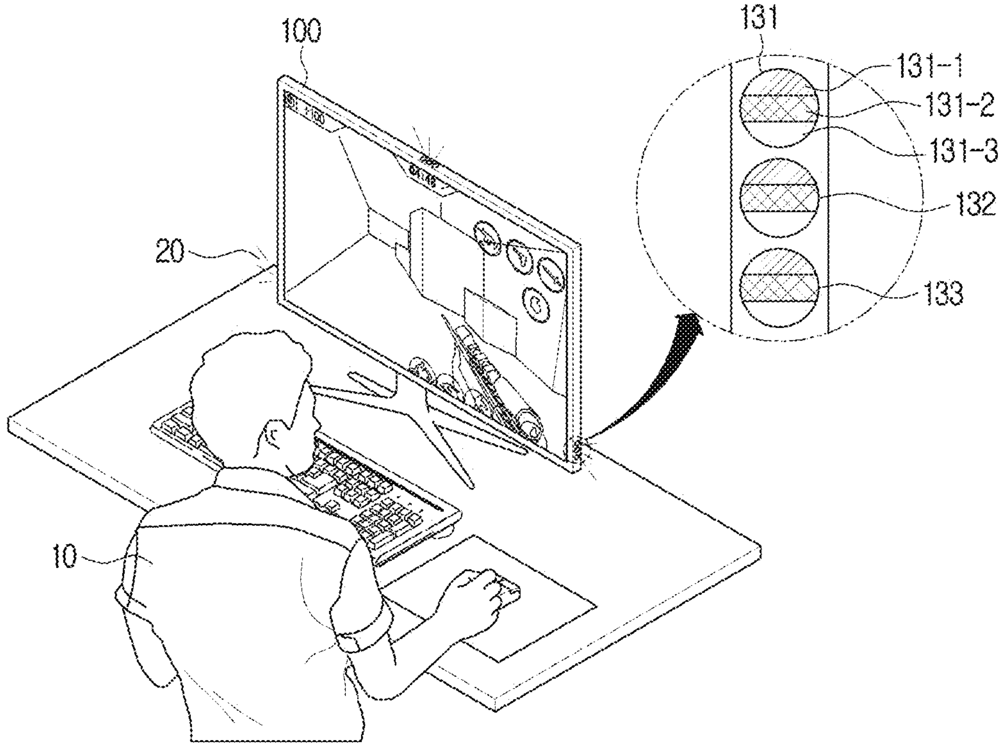
FIG. 1 is a diagram illustrating a lighting effect providing operation of a display device.

FIG. 1 is a diagram illustrating a lighting effect providing operation of a display device.

Referring to FIG. 1, a display device 100 may provide content of various types to a user 10. For example, the display device 100 may provide game content, but the disclosure is not limited thereto.

The display device 100 may be implemented in a device of various types such as, for example, and without limitation, a digital TV, a DVD player, a Blu-ray disc player, a game device, a network TV, a smart TV, an internet TV, a web TV, an internet protocol television (IPTV), signage, a PC, a head mounted display (HMD, wearable device), and the like, but is not limited thereto.

The display device 100 may include a plurality of light emitting diodes (LEDs) at one side of the device. Here, a plurality of LEDs 131, 132, 133, etc. may include a plurality of sub LEDs that emit light of different colors, respectively. For example, one LED 131 may include an R LED 131-1 which emits light of a red color, a G LED 131-2 which emits light of a green color, and B LED 131-3 which emits light of a blue color. In FIG. 1, sub LEDs of three types have been shown, but is not limited thereto, and the display device 100 may include a W LED which emits light of a white color in addition thereto.

The display device 100 according to an example may control a light emitting state of the plurality of LEDs 131, 132, 133, etc. based on RGB grayscale data corresponding to the game content and thereby, the display device 100 may provide a lighting effect 20 associated with content to the user 10.

The user 10 may perceive brightness or a color of light provided through the lighting effect 20 differently according to illuminance or a color temperature of a space in which the display device 100 is used. The above is not only because sensitivity of an eye of the user 10 reacting to an intensity of light changing according to an illuminance of the space, but also sensitivity (hereinafter, visual sensitivity) of the eye of the user 10 perceiving brightness for each wavelength of light changing.

For example, the user 10 may react sensitively to the intensity of light due to pupils expanding in a dark place compared to a bright place, and react more sensitively to light of a low wavelength compared to a bright place due to changes in visual sensitivity.

In addition, the user 10 may react more sensitively to light which is provided through the lighting effect 20 as a difference between the color temperature of the space and a color temperature of light provided through the lighting effect 20 is greater. The above is because, as fatigue of cone cells sensing color corresponding to the color temperature of the space increases, sensitivity regarding the corresponding color of the user 10 decreases.

As described above, a degree of satisfaction obtained by the user 10 through the lighting effect 20 may change according to the illuminance and color temperature of the space. The display device 100 according to an example may obtain surrounding environment information to provide a lighting effect 20 satisfactory to the user 10 even if a surrounding environment such as illuminance or color temperature of the space is changed, and provide a lighting effect 20 which takes into consideration the obtained surrounding environment information.

Various embodiments in which color or brightness information corresponding to the plurality of LEDs is modified based on the surrounding environment information, and in which the lighting effect is provided based on the modification result will be described in greater detail below.

Figure 2:
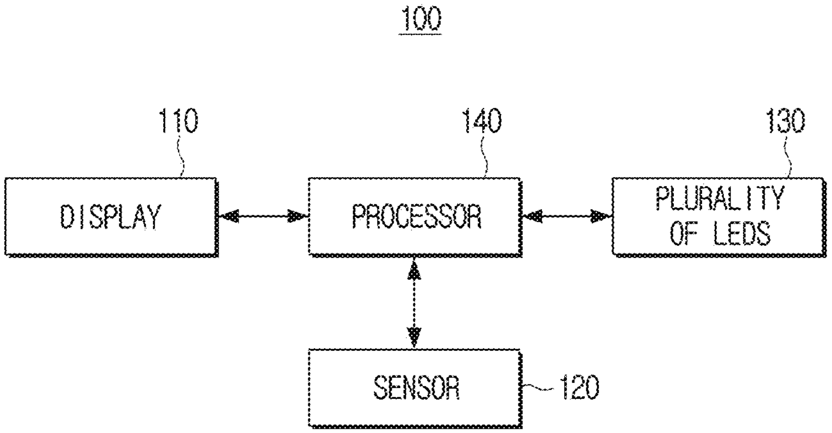
FIG. 2 is a block diagram illustrating an example configuration of a display device according to various embodiments.

FIG. 2 is a block diagram illustrating an example configuration of a display device according to various embodiments.

Referring to FIG. 2, the display device 100 may include a display 110, a sensor 120, a plurality of LEDs 130, and a processor (e.g., including processing circuitry) 140.

The display 110 may be a configuration for providing an image associated with content to the user. The display 110 may be implemented as a display of various types such as, for example, and without limitation, a liquid crystal display (LCD), an organic light emitting diode (OLED) display, a quantum dot light emitting diode (QLED) display, a plasma display panel (PDP), and the like. In the display 110, a driving circuit, which may be implemented in the form of a thin film transistor (TFT), a low temperature poly silicon (LTPS) TFT, an organic TFT (OTFT), and the like, a backlight unit, and the like may be included. Meanwhile, the display 110 may be implemented as a flexible display, a three-dimensional display (3D display), and the like.

The display 110 may include a plurality of pixels, and the plurality of pixels may include R, G, and B sub pixels which emit a red color, a green color, and a blue color.

The sensor 120 may measure a physical quantity or sense an operating state of the display device 100, and convert the measured or sensed information to an electric signal. The sensor 120 may include at least one from among a gesture sensor, a gyro sensor, an atmospheric pressure sensor, a magnetic sensor, a distance sensor, an acceleration sensor, a grip sensor, a proximity sensor, a biometric sensor, a temperature/humidity sensor, or an ultra violet (UV) sensor. Specifically, the sensor 120 according to an embodiment of the disclosure may be implemented as an illuminance sensor and a color sensor (e.g., a red, green, and blue (RGB) sensor).

The plurality of LEDs 130 may be provided at one region of the display 110, for example, a bezel region of the display 110 or a back surface of the display 110, and emit light of different colors. For example, the plurality of LEDs 130 may include a plurality of light sources such as the R LED which emits the red color light, the G LED which emits the green color light, and the B LED which emits the blue color light. In addition, the plurality of LEDs 130 may further include the W LED which emits the white color light.

The processor 140 may include various processing circuitry and control the overall operation of the display device 100. Specifically, the processor 140 may control the overall operation of the display device 100 by being connected with each configuration of the display device 100. For example, the processor 140 may control the operation of the display device 100 by being connected with the display 110, the sensor 120, and the plurality of LEDs 130.

The processor 140 according to an embodiment may be designated to various designations such as, for example, and without limitation, a digital signal processor (DSP), a microprocessor, a central processing unit (CPU), a micro controller unit (MCU), a micro processing unit (MPU), a neural processing unit (NPU), a controller, an application processor (AP), and the like, but is described as the processor 140 in the disclosure.

The processor 140 may be implemented as a system on chip (SoC), or a large scale integration (LSI), and implemented in a form of a field programmable gate array (FPGA). In addition, the processor 140 may include a volatile memory such as an SRAM. The processor 140 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The processor 140 according to an example may be implemented in a form including a driver IC for driving the plurality of LEDs 130. For example, the processor 140 may be implemented as the DSP, and may be implemented with a digital driver IC and one chip. However, the driver IC may also be implemented with hardware separate from the processor 140. For example, the driver IC may be implemented as at least one LED driver which controls current applied to a plurality of LED devices included in the plurality of LEDs 130. According to an embodiment, the LED driver may be disposed at back end of a power supply (e.g., a switching mode power supply (SMPS)) and receive voltage from the power supply. However, according to an embodiment, voltage may be received from a separate power source device. Alternatively, it may be possible to be implemented in a module form in which the SMPS and the LED driver are integrated into one.

The driver IC according to an example may output by adjusting at least one from among a supply time and intensity of current (or voltage) supplied to the plurality of LEDs 130. Specifically, the driver IC may variably control intensity of current (or voltage) supplied to the plurality of LEDs 130 through a pulse width modulation (PWM) method in which a duty ratio is varied. Here, a pulse width modulation (PWM) signal may control a light-on and light-off ratio of the plurality of light sources included in the plurality of LEDs 130, and the duty ratio (%) thereof may be determined according to a dimming value input from the processor 140.

The processor 140 according to an embodiment of the disclosure may obtain RGB grayscale data of pixels corresponding to a pre-set region of interest from an image provided through the display 110.

The region of interest may be a region that corresponds to different positions in the image by content type, and the region of interest according to an example may be a region including at least one from among a center region, a left lower end region, or a right lower end region of the image. The region of interest may be a region having at least one shape from among a circular-shape, an elliptical-shape, or a quadrangle-shape, but is not limited thereto.

The display device 100 according to an example may further include a memory, and the memory may store information on the region of interest by content type corresponding to an image provided through the display 110. If the user selects information associated with the content type through a user interface (UI) provided through the display 110, the processor 140 may set the region of interest corresponding to the type of content selected by the user based on information stored in the memory.

Information on the region of interest by content type may include information on different positions in an image by content type. The different positions in the image may include at least one from among the center region, the left lower end region, or the right lower end region of the image.

For example, if an image corresponding to a first person shooter (FPS) game type content is provided through the display 110, the processor 140 may identify a certain region positioned at a center of a screen as the region of interest. Meanwhile, if an image corresponding to a multiplayer online battle arena (MOBA) game type content is provided through the display 110, the processor 140 may identify a certain region positioned on at least one from among a left lower end or a right lower end of the screen as the region of interest. However, if a user command for changing the region of interest of a specific content type is input, the processor 140 may obtain update information for changing the pre-set region of interest corresponding to the specific content type based on the user command, and update information on the region of interest corresponding to the specific content type stored in the memory based on the obtained update information. Update may refer, for example, to an operation of storing information on the region of interest in which a size or a position is changed according to the user command in the memory, but is not limited thereto.

The RGB grayscale data may be data including grayscale values for driving the R, G, and B sub pixels included in the display 110. For example, if an image includes grayscales of 256 levels for each color signal of RGB, the RGB grayscale data may include numerical values ranging from 0 to 255 corresponding to the R, G, and B sub pixels, respectively.

In addition, the processor 140 may identify at least one from among color information or brightness information corresponding to the plurality of LEDs 130 based on the obtained RGB grayscale data. Here, the color information may include grayscale information for driving the RGB LEDs included in the plurality of LEDs 130, and the brightness information may include information on a brightness of light emitted through the RGB LEDs.

The processor 140 according to an example may obtain an average value of a R grayscale value, an average value of a G grayscale value, and an average value of a B grayscale value, respectively, of the pixels included in the region of interest, and identify at least one from among the color information or the brightness information corresponding to the plurality of LEDs 130 based on the obtained RGB average value, but is not limited thereto.

In addition, the processor 140 may obtain surrounding environment information based on sensing data obtained through the sensor 120. The surrounding environment information may include illuminance information on illuminance of a space in which the user is positioned and color temperature information on the color temperature of the space, but is not limited thereto.

In addition, the processor 140 may modify the identified color information and brightness information based on the surrounding environment information. According to an example, the processor 140 may adjust a RGB grayscale value for driving the plurality of LEDs 130 taking into consideration the surrounding environment information, or adjust information on an intensity of light emitted through the plurality of LEDs 130.

In addition, the processor 140 may provide a lighting effect associated with the content to the user by controlling the light emitting state of the plurality of LEDs 130 based on at least one from among the modified color information or the modified brightness information.

If the sensor 120 according to an example includes an illuminance sensor, the processor 140 may modify the brightness information corresponding to the plurality of LEDs 130 based on surrounding brightness information (ambient brightness information) obtained by the illuminance sensor, and control the light emitting state of the plurality of LEDs 130 based on the modified brightness information. For example, the processor 140 may obtain a gain value which is proportional to the surrounding brightness information obtained by the illuminance sensor, and apply the obtained gain value to the brightness information corresponding to the plurality of LEDs 130.

For example, the processor 140 may obtain a gain value (less than 1) for reducing brightness of light which is emitted through the plurality of LEDs 130 if an illuminance of a space measured by the illuminance sensor is less than or equal to a first threshold brightness. Conversely, the processor 140 may obtain a gain value (greater than 1) for increasing the brightness of light emitted through the plurality of LEDs 130 if the illuminance of the space measured by the illuminance sensor is greater than or equal to a second threshold brightness.

The processor 140 may obtain the modified brightness information by applying the obtained gain value to the identified brightness information, and drive the plurality of LEDs 130 based on the modified brightness information.

If the sensor 120 according to an example includes the color sensor, the processor 140 may obtain surrounding color information (ambient color information) based on sensing data obtained by the color sensor. The processor 140 according to an example may measure a color temperature of a space based on the sensing data, and obtain color information of the space having a RGB grayscale value corresponding to the measured color temperature, but is not limited thereto.

In addition, the processor 140 may modify the color information corresponding to the plurality of LEDs 130 based on the surrounding color information, and control the light emitting state of the plurality of LEDs 130 based on the modified color information.

The processor 140 may modify the color information corresponding to the plurality of LEDs 130 based on a pre-set lighting mode and the surrounding color information, and control the light emitting state of the plurality of LEDs 130 based on the modified color information. Here, the pre-set lighting mode may be determined based on at least one from among a user command, a use history, or an image type.

A pre-set (e.g., specified) mode according to an example may include at least one from among a contrast color mode or a similar color mode. Here, the contrast color mode may be a mode for controlling the plurality of LEDs 130 for light of a same color as the RGB colors corresponding to the color temperature of the space measured through the color sensor to be attenuated and output, and for light of a color in a complementary relationship with the RGB colors corresponding to the color temperature of the space to be amplified and output.

For example, the processor 140 may increase, based on a grayscale value of a specific color included in the surrounding color information being relatively lower than the grayscale values of the remaining colors in the contrast color mode, the grayscale value of the specific color corresponding to the plurality of LEDs 130, and modify, based on the grayscale value of the specific color included in the surrounding color information being relatively higher than the grayscale values of the remaining colors, the color information corresponding to the plurality of LEDs 130 by reducing the grayscale value of the specific color corresponding to the plurality of LEDs 130.

The similar color mode may be a mode for controlling the plurality of LEDs 130 for light of a same color as the RGB colors corresponding to the color temperature of the space measured through the color sensor to be amplified and output, and for light of a color in the complementary relationship with the RGB colors corresponding to the color temperature of the space to be attenuated and output.

For example, the processor 140 may reduce, based on a grayscale value of a specific color included in the surrounding color information being relatively lower than the grayscale values of the remaining colors in the contrast color mode, the grayscale value of the specific color corresponding to the plurality of LEDs 130, and modify, based on the grayscale value of the specific color included in the surrounding color information being relatively higher than the grayscale values of the remaining colors, the color information corresponding to the plurality of LEDs 130 by increasing the grayscale value of the specific color corresponding to the plurality of LEDs 130.

Figure 3:
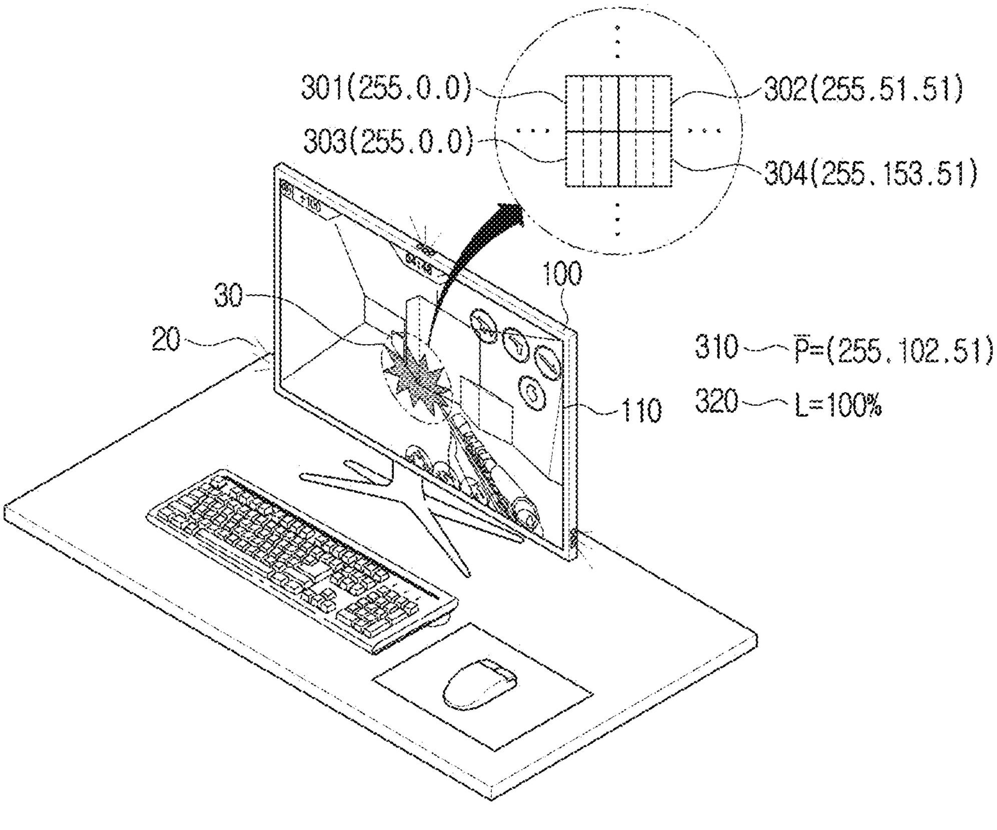
FIG. 3 is a diagram illustrating a color information and brightness information obtaining operation corresponding to a plurality of LEDs according to various embodiments.

FIG. 3 is a diagram illustrating an example color information and brightness information obtaining operation corresponding to a plurality of LEDs according to various embodiments.

If the display device 100 provides the lighting effect 20 based on the RGB grayscale data included in the image as a whole, there is a problem of a light emitting period of the plurality of LEDs 130 becoming longer due to an excessive amount of data to be processed by the processor 140 and thereby providing the lighting effect 20, which reflects image frame changes in real-time, becoming difficult by the device 100. To overcome the above, the processor 140 may provide the lighting effect 20 taking into consideration only the RGB grayscale data 301 to 304 corresponding to a region of interest 30.

Specifically, the processor 140 may obtain the RGB grayscale data 301 to 304 corresponding to the region of interest 30 in the image provided through the display 110, and obtain color information 310 or brightness information 320 corresponding to the plurality of LEDs 130 based on the obtained RGB grayscale data 301 to 304. Here, the region of interest 30 may be a region which includes at least one from among a region to which the user observes for a long time in the image or a region at which important information associated with the content is displayed, but is not limited thereto.

Referring to FIG. 3, the display device 100 may provide game content. The processor 140 may identify a center region of an image as the region of interest 30, and obtain RGB grayscale data of pixels included in the identified region of interest 30.

For example, a first pixel 301 may have a RGB grayscale value of (255, 0, 0), and a second pixel to a fourth pixel 302 to 304 may have RGB grayscale values of (255, 51, 51), (255, 0, 0), and (255, 153, 51), respectively, from among the plurality of pixels included in the region of interest 30. The processor 140 may obtain the average value of the R grayscale value, the average value of the G grayscale value, and the average value of the B grayscale value, respectively, of the plurality of pixels by obtaining the RGB grayscale values corresponding to the plurality of pixels within the region of interest 30 which includes the first pixel to fourth pixel 301, 302, 303 and 304 (which may be referred to as 301 to 304).

The processor 140 may obtain the color information 310 corresponding to the plurality of LEDs 130 which include the obtained average value of the R grayscale value of the plurality of pixels, the obtained average value of the G grayscale value of the plurality of pixels, and the obtained average value of the B grayscale value of the plurality of pixels.

In addition, the processor 140 may obtain the brightness information 320 corresponding to the plurality of LEDs 130 based on the obtained average value of the R grayscale value of the plurality of pixels, the obtained average value of the G grayscale value of the plurality of pixels, and the obtained average value of the B grayscale value of the plurality of pixels. For example, the processor 140 may control for the plurality of LEDs 130 to emit light of a pre-set brightness (L=100%) if a sum of the average value of the R grayscale value, the average value of the G grayscale value, and the average value of the B grayscale value of the plurality of pixels is greater than or equal to a threshold value, and control for the plurality of LEDs 130 to not emit light (L=0%) if the sum of the average value of the R grayscale value, the average value of the G grayscale value, and the average value of the B grayscale value of the plurality of pixels is less than the threshold value.

Referring to FIG. 3, the processor 140 may provide the lighting effect 20 by identifying the sum of the average value of the R grayscale value, the average value of the G grayscale value, and the average value of the B grayscale value of the plurality of pixels as greater than or equal to the threshold value, obtaining brightness information 320 for controlling the plurality of LEDs 130 to emit light of a pre-set brightness, and controlling the plurality of LEDs 130 based on the obtained color information 310 and brightness information 320.

Figure 4A:
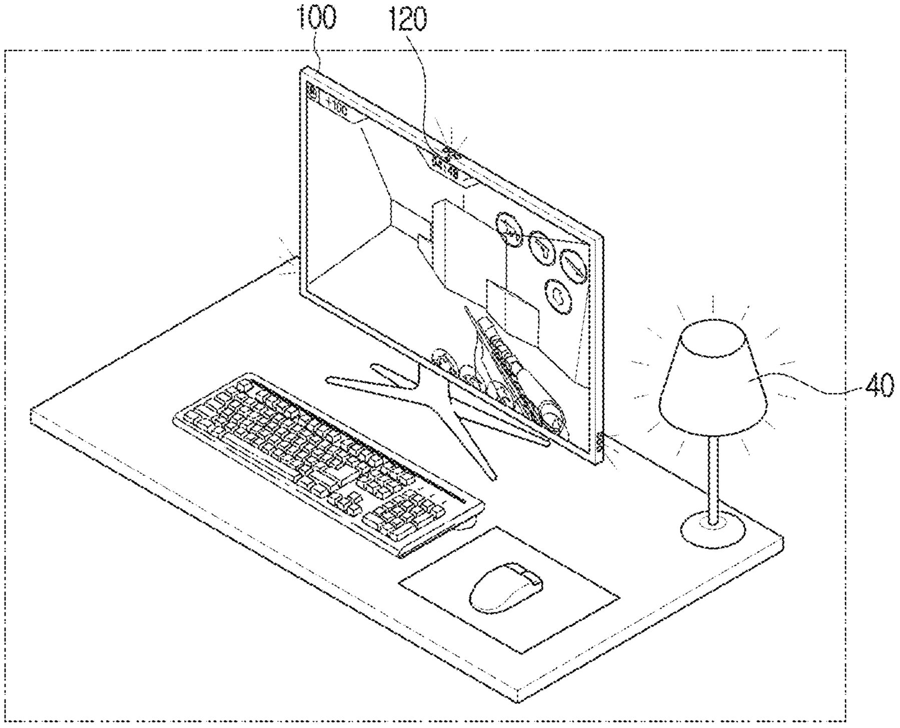
FIG. 4A and FIG. 4B are diagrams illustrating surrounding environment information according to various embodiments.
Figure 4B:
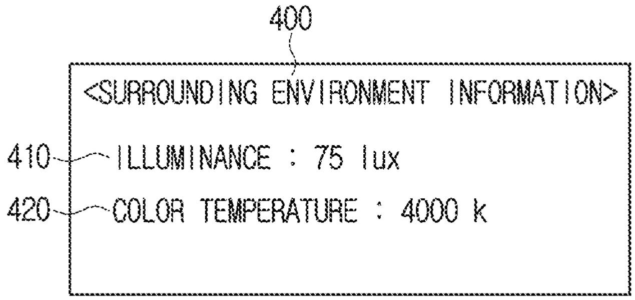

FIG. 4A and FIG. 4B are diagrams illustrating surrounding environment information according to various embodiments.

Referring to FIG. 4A, a space in which the display device 100 is positioned may be a space having a specific illuminance and color temperature. In addition, the space in which the display device 100 is positioned may change in illuminance and color temperature according to a user environment of the device 100 changing. For example, the illuminance and color temperature of the space may change according to an operation of the lighting device 40 positioned within the space.

Referring to FIG. 4B, the processor 140 may identify the illuminance and color temperature corresponding to the space through the sensor 120, and obtain surrounding environment information 400 which includes information on the identified illuminance and color temperature. For example, the processor 140 may identify that the illuminance of the space in which the display device 100 is positioned is 75 lux, and the color temperature thereof is 4000K, and obtain the surrounding environment information 400 which includes information on illuminance 410 and information on color temperature 420.

The processor 140 may provide a lighting effect suitable to the visual sensitivity characteristics of the user by taking into consideration the illuminance 410 and the color temperature 420 of the space included in the obtained surrounding environment information 400, and a specific operation of the display device 100 associated therewith will be described in greater detail below with reference to FIGS. 5A, 5B, 6A, 6B and 7.

The processor 140 may update the surrounding environment information 400 based on the illuminance and the color temperature of the space identified through the sensor 120 based on at least one from among an event in which the surrounding environment changes, an event in which a user command for re-identifying the surrounding environment is input, or an event in which a pre-set re-identification period of the surrounding environment arrives.

Figure 5A:
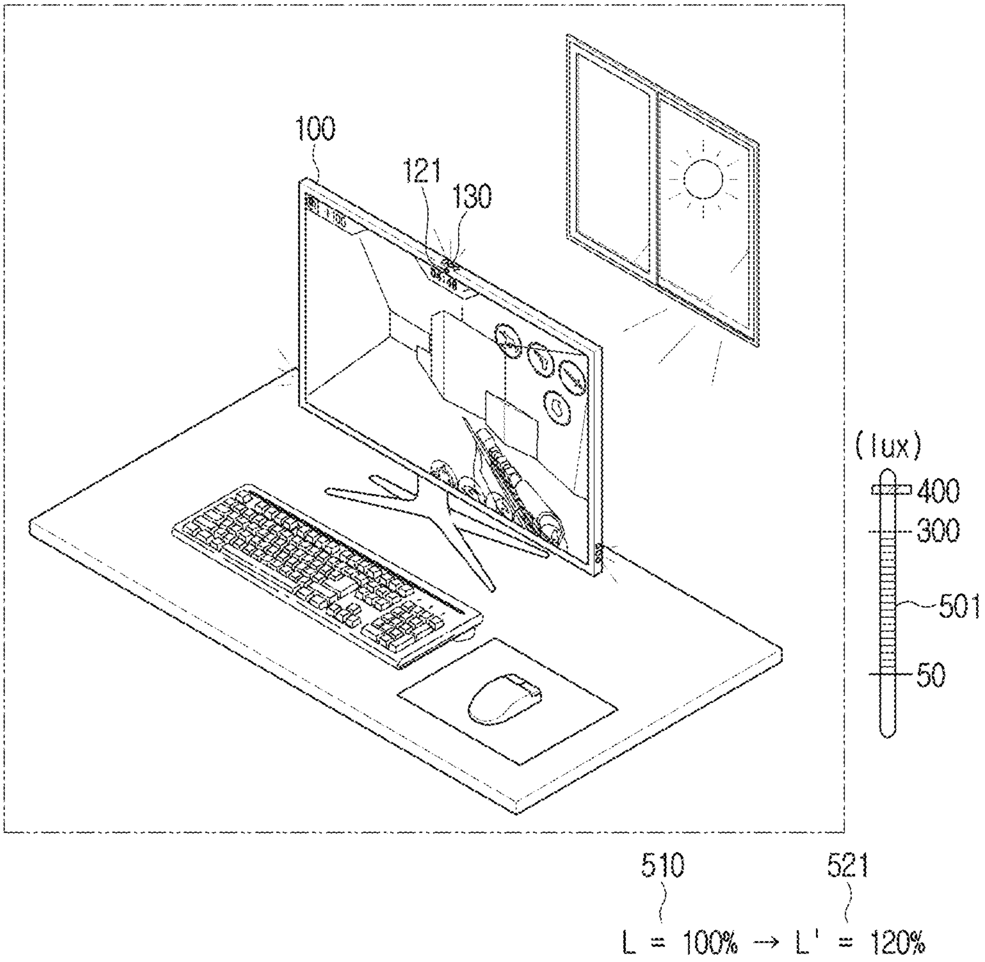
FIG. 5A and FIG. 5B are diagrams illustrating an example brightness information modifying operation according to various embodiments.
Figure 5B:
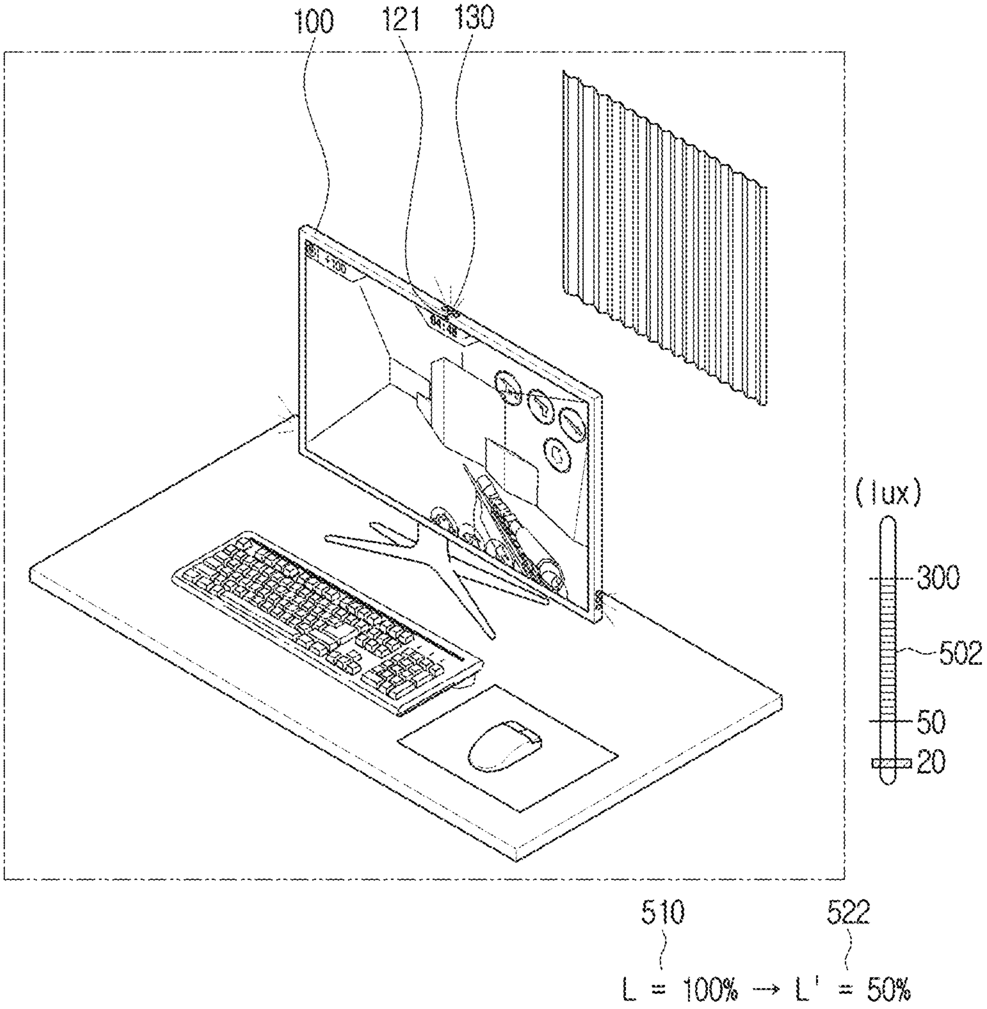

FIG. 5A and FIG. 5B are diagrams illustrating an example brightness information modifying operation according to various embodiments.

Referring to FIG. 5A, the display device 100 positioned in an indoor space in which introduction of light is blocked by a curtain may include an illuminance sensor 121. The processor 140 may modify brightness information corresponding to the plurality of LEDs 130 based on surrounding brightness information obtained by the illuminance sensor 121.

For example, based on the processor 140 identifying the illuminance of the space as 20 lux, and the identified illuminance being less than or equal to 50 which is the first threshold value, a gain value (0.5) for reducing brightness corresponding to the plurality of LEDs 130 may be obtained. The processor 140 may obtain brightness information 521 modified by applying the obtained gain value to brightness information 510 for the plurality of LEDs 130 to emit light of a pre-set brightness.

In addition, the processor 140 may provide the lighting effect 20 suitable to the visual sensitivity characteristics of the user in a dark indoor space by controlling the light emitting state of the plurality of LEDs 130 based on the modified brightness information 521 for the plurality of LEDs 130 to emit light corresponding to 50% of the pre-set brightness.

Referring to FIG. 5B, the display device 100 positioned in an indoor space in which a window is open may include the illuminance sensor 121. The processor 140 may modify brightness information corresponding to the plurality of LEDs 130 based on surrounding brightness information obtained by the illuminance sensor 121.

For example, the processor 140 may obtain, based on an illuminance of the space being identified as 400 lux, and the identified illuminance being greater than or equal to 300 which is the second threshold value, a gain value (1.2) for increasing brightness corresponding to the plurality of LEDs 130. The processor 140 may obtain brightness information 522 modified by applying the obtained gain value to the brightness information 510 for the plurality of LEDs 130 to emit light of a pre-set brightness.

In addition, the processor 140 may provide the lighting effect 20 suitable to the visual sensitivity characteristics of the user in a bright indoor space by controlling the light emitting state of the plurality of LEDs 130 based on the modified brightness information 522 for the plurality of LEDs 130 to emit light corresponding to 120% of the pre-set brightness.

Figure 6A:
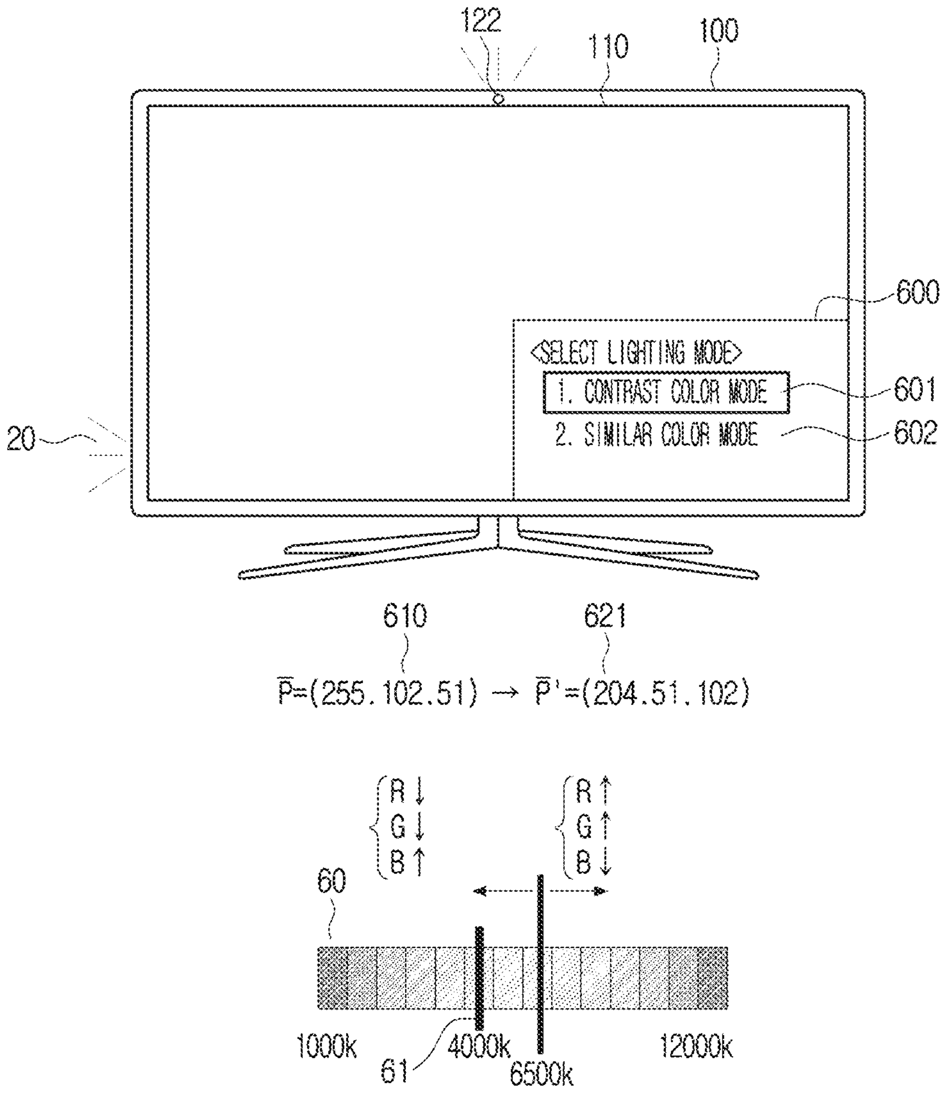
FIG. 6A and FIG. 6B are diagrams illustrating an example color information modifying operation according to various embodiments.
Figure 6B:
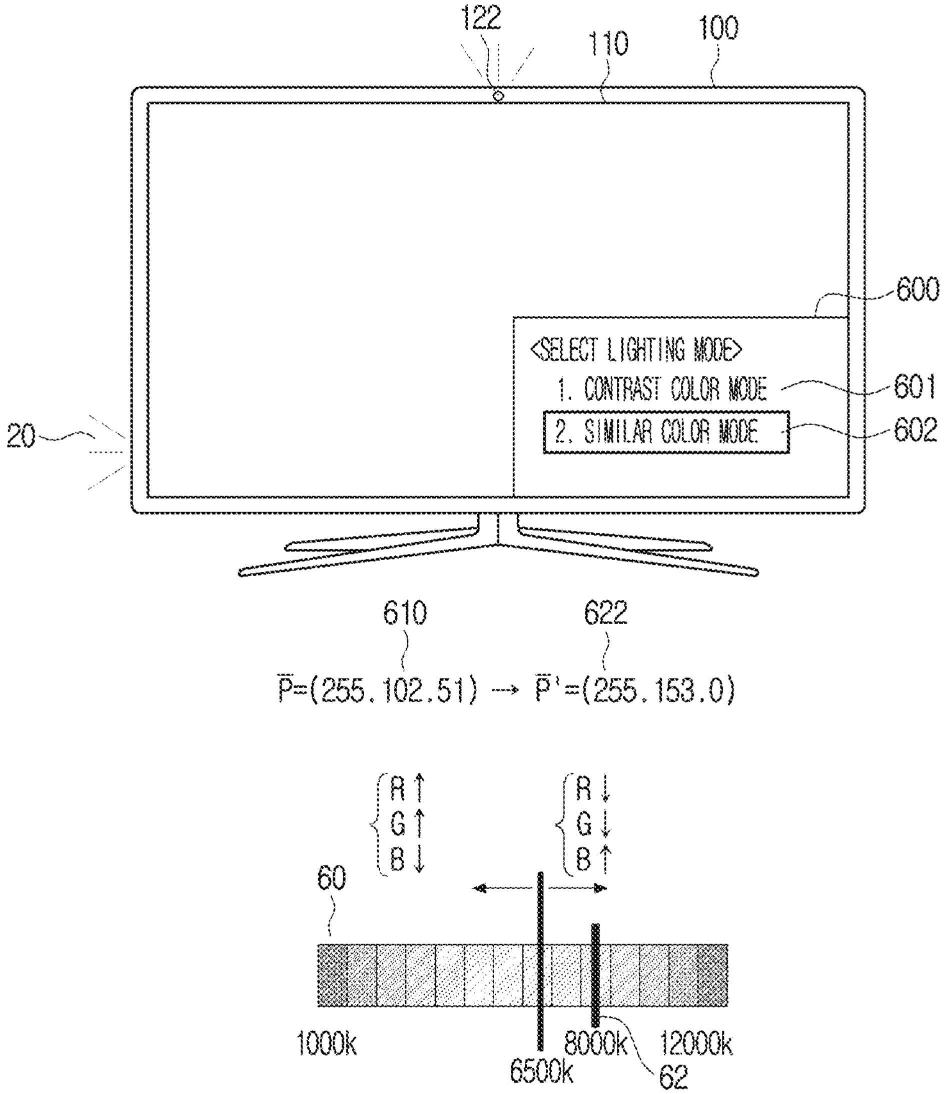

FIG. 6A and FIG. 6B are diagrams illustrating an example color information modifying operation according to various embodiments.

The display device 100 according to an example may include a color sensor 122. The color temperature of the space may be determined based on at least one from among whether sunlight is introduced or whether lighting devices of various types are operated, and the processor 140 may measure the color temperature of the space in which the display device 100 is positioned through the color sensor 122.

A range of color temperatures of a space 60 typically has a value between 1000K to 12000K, and a color temperature between 1000K to 6500K corresponds to a color (R, G, B=255, 56, 0) which is close to an orange color, and a color temperature between 6500K to 12000K may correspond to a color (R, G, B=195, 209, 255) which is close to a blue color.

The user positioned in a space with a low color temperature may be insensitive to light having a color close to the orange color, and have visual sensitivity characteristics of being sensitive to light having a color close to the blue color. Conversely, the user positioned in a space with a high color temperature may be insensitive to light having a color close to the blue color, and have visual sensitivity characteristics of being sensitive to light having a color close to the orange color.

The processor 140 may modify the color information corresponding to the plurality of LEDs 130 based on the pre-set lighting mode and the surrounding color information obtained by the color sensor 122. Here, the pre-set lighting mode may include the contrast color mode and the similar color mode, and the processor 140 may provide the lighting effect 20 corresponding to the lighting mode selected based on the user command for selecting one from among a plurality of lighting modes.

For example, the user may transmit a user command for selecting one from among the plurality of lighting modes to the display device 100 through a remote control device (not shown) or input the user command for selecting one from among the plurality of lighting modes by operating a user interface provided in the display device 100.

Referring to FIG. 6A, the processor 140 may provide a user interface (UI) 600 for receiving the user command for selecting one from among the plurality of lighting modes through the display 110. In addition, the processor 140 may identify that the color temperature of the space in which the display device 100 is positioned is 4000K 61 through the color sensor 122. In addition, the processor 140 may identify that a RGB grayscale value corresponding to the color temperature 61 of the space is (255, 209, 163).

If the user command for selecting a contrast color mode 601 from among the plurality of lighting modes is input through the UI 600, the processor 140 may obtain color information 621 modified based on color information 610 corresponding to the plurality of LEDs 130 and surrounding color information corresponding to the color temperature 61 of the space.

For example, the processor 140 may increase, based on the contrast color mode being selected 601, a grayscale value of a B color corresponding to the plurality of LEDs 130 if the color temperature of the space is less than 6500K, and modify color information corresponding to the plurality of LEDs 130 in a direction of reducing grayscale values of R and G colors corresponding to the plurality of LEDs 130.

Conversely, the processor 140 may reduce the grayscale value of the B color corresponding to the plurality of LEDs 130 if the color temperature of the space is greater than or equal to 6500K, and modify color information corresponding to the plurality of LEDs 130 in a direction of increasing the grayscale values of the R and G colors corresponding to the plurality of LEDs 130.

Referring to FIG. 6A, the processor 140 may increase the grayscale value of the B color corresponding to the plurality of LEDs 130 based on the grayscale value of the B color included in the surrounding color information corresponding to the space having a surrounding color temperature (or ambient color temperature) of less than 6500K being relatively lower than grayscale values of the remaining colors, and obtain the modified brightness information 621 by reducing the grayscale values of the R and G colors corresponding to the plurality of LEDs 130 based on the grayscale values of the R and G colors included in the surrounding color information being relatively higher than the grayscale values of the remaining colors.

Referring to FIG. 6B, the processor 140 may identify that the color temperature of the space in which the display device 100 is positioned is 8000K 62 through the color sensor 122. In addition, the processor 140 may identify that the RGB grayscale value corresponding to a color temperature 62 of the space is (227, 233, 255).

If a user command for selecting a similar color mode 602 is input from among the plurality of lighting modes through the UI 600, the processor 140 may obtain color information 622 modified based on the color information 610 corresponding to the plurality of LEDs 130 and the surrounding color information corresponding to the color temperature 62 of the space.

For example, the processor 140 may increase, based on the similar color mode being selected 602, the grayscale values of the R and G colors corresponding to the plurality of LEDs 130 if the color temperature of the space is less than 6500K, and modify the color information corresponding to the plurality of LEDs 130 in a direction of reducing the grayscale value of the B color corresponding to the plurality of LEDs 130. Conversely, the processor 140 may reduce the grayscale values of the R and G colors corresponding to the plurality of LEDs 130 if the color temperature of the space is greater than or equal to 6500K, and modify the color information corresponding to the plurality of LEDs 130 in a direction of increasing the grayscale value of the color B corresponding to the plurality of LEDs 130.

Referring to FIG. 6B, the processor 140 may reduce the grayscale values of the R and G colors corresponding to the plurality of LEDs 130 based on the grayscale values of the R and G colors included in the surrounding color information corresponding to the space having the surrounding color temperature 62 of greater than or equal to 6500K being relatively lower than the grayscale values of the remaining colors, and obtain the modified brightness information 622 by increasing the grayscale value of the B color corresponding to the plurality of LEDs 130 based on the grayscale value of the B color included in the surrounding color information being relatively higher than the grayscale values of the remaining colors.

Through the above-described modification operation of the color information 610, the display device 100 may provide the lighting effect 20 in a method desired by the user using the device 100 in a space having a specific color temperature. For example, the user who selected the contrast color mode 601 may receive a lighting effect having a more intense visual effect due to a complementary color of the color corresponding to the color temperature of the space being amplified, and the user who selected the similar color mode 602 may receive a lighting effect having a more comfortable visual effect due to a color corresponding to the color temperature of the space being amplified.

The contrast color mode 601 may be a mode for controlling the plurality of LEDs 130 for light of a same color as the RGB colors corresponding to the color temperature of the space measured through the color sensor to be attenuated and output, and light of a color in a complementary color relationship with the RGB colors corresponding to the color temperature of the space to be amplified and output.

In FIG. 6A and FIG. 6B, the pre-set lighting mode has been described as being determined based on the user command, but is not limited thereto, and the processor 140 may identify a lighting mode with a high selection frequency by the user as the pre-set lighting mode, or identify a lighting mode optimized to an image type provided through the display 110 as the pre-set lighting mode.

Figure 7:
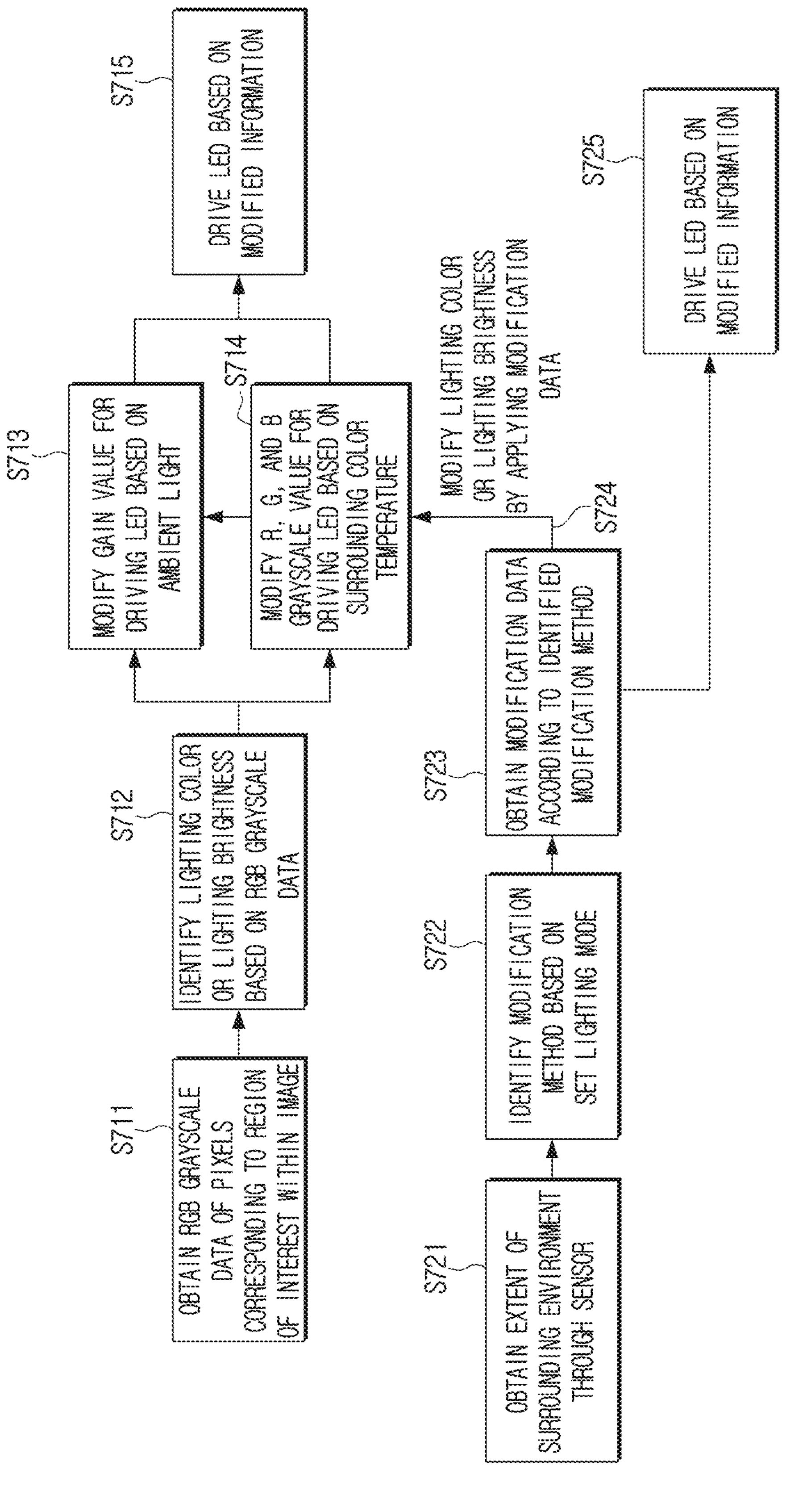
FIG. 7 is a diagram illustrating an example brightness information and color information modifying operation according to various embodiments.

FIG. 7 is a diagram illustrating an example brightness information and color information modifying operation according to various embodiments.

A modification method of brightness information and color information according to an embodiment of the disclosure may include obtaining RGB grayscale data of pixels corresponding to a region of interest within an image provided through the display 110 (S711). A lighting color or a lighting brightness provided through the plurality of LEDs 130 may be identified based on the obtained RGB grayscale data (S712).

The surrounding environment information which includes information of the illuminance and the color temperature of the space may be obtained through the sensor 120 (S721). Then, a modification method of the color or brightness of lighting provided through the plurality of LEDs 130 may be identified based on the set lighting mode (S722). Modification data according to the identified modification method may be obtained (S723). The modification data may include a gain value for modifying brightness information or a modification value for modifying color information, but is not limited thereto.

Modification of at least one from among the color of lighting or the brightness of lighting provided through the plurality of LEDs 130 may be performed by applying the obtained modification data (S724). For example, in the modification process, a gain value for driving the plurality of LEDs 130 may be modified based on ambient light of the display device 100 (S713), or a RGB grayscale value for driving the plurality of LEDs 130 may be modified based on the surrounding color temperature of the display device 100 (S714).

By driving the plurality of LEDs 130 based on information performed with modification relating to the lighting color or the lighting brightness (S725), an optimal lighting effect reflecting the visual sensitivity characteristics of the user according to the surrounding environment may be provided.

Figure 8:
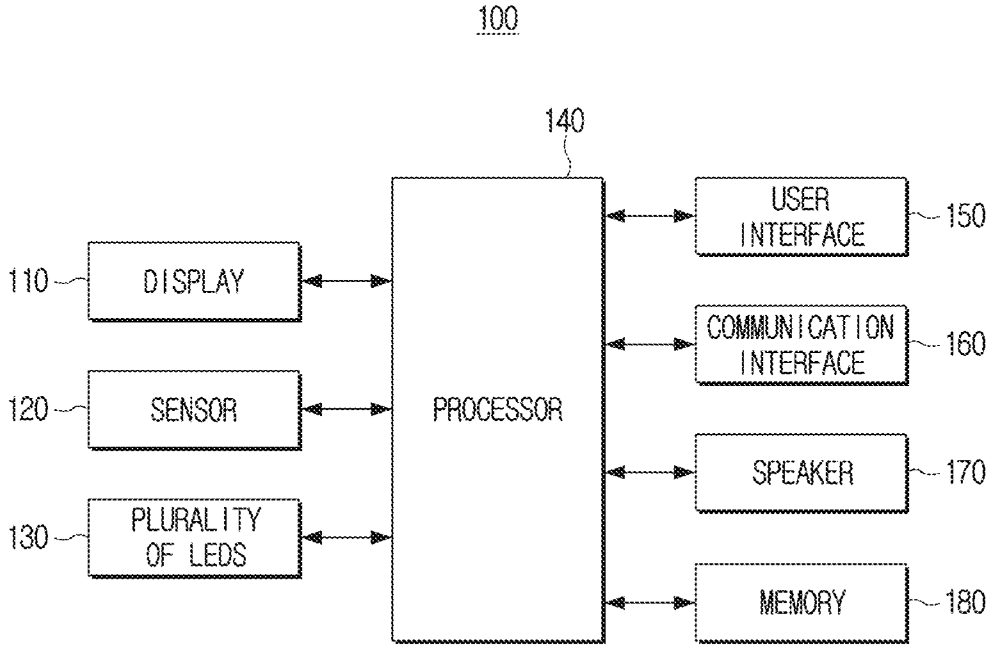
FIG. 8 is a block diagram illustrating an example configuration of a display device according to various embodiments.

FIG. 8 is a block diagram illustrating an example configuration of a display device according to various embodiments.

Referring to FIG. 8, the display device 100 may include the display 110, the sensor 120, the plurality of LEDs 130, the processor (e.g., including processing circuitry) 140, a user interface (e.g., including interface circuitry) 150, a communication interface (e.g., including communication circuitry) 160, and a speaker 170. Detailed descriptions of configurations that overlap with the configurations shown in FIG. 2 from among the configurations shown in FIG. 8 may not be repeated here.

The user interface 150 may be a configuration involved in the display device 100 performing an interaction with the user. For example, the user interface 150 may include at least one from among a touch sensor, a motion sensor, a button, a jog dial, a switch, or a microphone, but is not limited thereto.

In addition, if the user controls the display device 100 remotely, the user interface 150 may include a receiver for receiving a control signal transmitted from a remote control device operated by the user.

The communication interface 160 may include various circuitry and input and output data of various types. For example, the communication interface 160 may transmit and receive data of various types with the display device 100 through communication methods such as, for example, and without limitation, an AP based Wi-Fi (e.g., Wi-Fi, wireless LAN network), Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like.

For example, the processor 140 may control the communication interface 160 to receive information on content provided through the display 110. In addition, the processor 140 may control the communication interface 160 to transmit information associated with providing of lighting effect of the display device 100 to a user terminal (not shown).

The speaker 170 may be a device that converts an electro-acoustical signal generated from the processor 140 and corresponding to an audio provided by the display device 100 to a sound wave. The speaker 170 may include a permanent magnet and coils, and a diaphragm, and may output sound by vibrating the diaphragm by electromagnetic interaction that occurs between the permanent magnet and coils. For example, the processor 140 may control the speaker 170 to output an audio corresponding to content provided through the display 110.

A memory 180 may store data necessary for the various embodiments of the disclosure. The memory 180 may be implemented in the form of a memory embedded in the display device 100 according to a data storage use, or in the form of a memory attachable to or detachable from the display device 100. For example, the data for the driving of the display device 100 may be stored in the memory embedded in the display device 100, and data for an expansion function of the display device 100 may be stored in the memory attachable to or detachable from the display device 100. Meanwhile, the memory embedded in the display device 100 may be implemented as at least one from among a volatile memory (e.g., a dynamic RAM (DRAM), a static RAM (SRAM), or a synchronous dynamic RAM (SDRAM)), or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard disk drive (HDD) or a solid state drive (SSD)). In addition, the memory attachable to or detachable from the display device 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

The memory 180 according to an example may store information on regions of interest for each content type. The information of the regions of interest for each content type may include information on different positions in an image for each content type, and the different positions in an image may include at least one from among the center region, the left lower end region, or the right lower end region of the image, but is not limited thereto.

Figure 9:
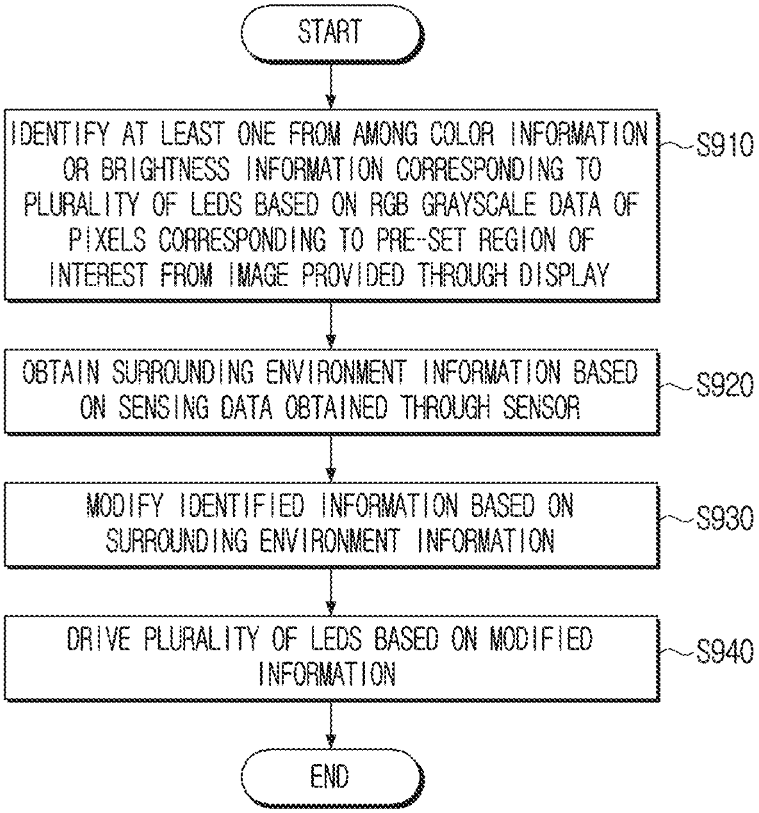
FIG. 9 is a flowchart illustrating an example method of controlling a display device according to various embodiments.

FIG. 9 is a flowchart illustrating an example method of controlling the display device according to various embodiments.

A method according to an embodiment of the disclosure includes identifying at least one from among color information or brightness information corresponding to the plurality of LEDs based on RGB grayscale data of pixels corresponding to the pre-set region of interest from the image provided through the display (S910).

The surrounding environment information may be obtained based on sensing data obtained through the senor (S920).

The identified information may be modified based on the surrounding environment information (S930).

The plurality of LEDs may be driven based on the modified information (S940).

In the modifying step (S930), brightness information corresponding to the plurality of LEDs may be modified based on the surrounding brightness information obtained by the illuminance sensor, and in the driving the plurality of LEDs step (S940), the plurality of LEDs may be driven based on the modified brightness information.

The modifying step (S930) may include obtaining a gain value proportionate to the obtained surrounding brightness information and modifying the brightness information by applying the obtained gain value to the brightness information corresponding to the plurality of LEDs.

The modifying step (S930) may include obtaining a gain value for reducing brightness corresponding to the plurality of LEDs based on the obtained surrounding brightness information being identified as less than or equal to the first threshold value and modifying the brightness information by applying the obtained gain value to the brightness information corresponding to the plurality of LEDs.

The modifying step (S930) may include obtaining a gain value for increasing brightness corresponding to the plurality of LEDs based on the obtained surrounding brightness information being identified as greater than or equal to the second threshold value and modifying the brightness information by applying the obtained gain value to the brightness information corresponding to the plurality of LEDs.

In the modifying step (S930), color information corresponding to the plurality of LEDs may be modified based on the surrounding color information obtained by the color sensor, and in the driving the plurality of LEDs step (S940), the plurality of LEDs may be driven based on the modified color information.

The pre-set lighting mode may be determined based on at least one from among the user command, the use history, or type of the image, and include at least one from among the contrast color mode or the similar color mode.

The modifying step (S930) may include increasing, based on a grayscale value of a specific color included in the surrounding color information being relatively lower than the grayscale values of the remaining colors in the contrast color mode, the grayscale value of the specific color corresponding to the plurality of LEDs and reducing, based on the grayscale value of the specific color included in the surrounding color information being relatively higher than the grayscale values of the remaining colors, the grayscale value of the specific color corresponding to the plurality of LEDs.

The modifying step (S930) may include reducing, based on the grayscale value of the specific color included in the surrounding color information being relatively lower than the grayscale values of the remaining colors in the similar color mode, the grayscale value of the specific color corresponding to the plurality of LEDs and increasing, based on the grayscale value of the specific color included in the surrounding color information being relatively higher than the grayscale values of the remaining colors, the grayscale value of the specific color corresponding to the plurality of LEDs.

In the identifying at least one from among color information or brightness information step (S910), the region of interest corresponding to the content type selected based on information on regions of interest for each content type may be set when the information associated with the content type is selected.

The information on regions of interest for each content type may include information on different positions in an image for each content type, and the different positions in the image may include at least one from among the center region, the left lower end region, or the right lower end region of the image.

Methods according to the various embodiments of the disclosure described above may be implemented in an application form installable in a display device of the related art.

The methods according to the various embodiments of the disclosure described above may be implemented with a software upgrade or a hardware upgrade of the display device of the related art.

In addition, the various embodiments of the disclosure described above may be performed through an embedded server included in a display device or through at least one external server.

The various embodiments described above may be implemented in a recordable medium which is readable by a computer or a device similar to the computer using software, hardware, or a combination thereof. In some cases, embodiments described herein may be implemented by the processor 140 itself. According to a software implementation, embodiments such as the procedures and functions described herein may be implemented with separate software modules. The respective software modules may perform one or more functions and operations described herein.

Computer instructions for performing processing operations in the display device 100 according to the various embodiments of the disclosure described above may be stored in a non-transitory computer-readable medium. The computer instructions stored in this non-transitory computer-readable medium may cause a specific device to perform a processing operation in the display device 100 according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments thereof, it will be understood that the various example embodiments are intended to be illustrative, not limiting. It will be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display device, comprising:

a display;

an illuminance sensor and a color sensor;

a plurality of light emitting diodes (LEDs) provided at one region of the display and configured to emit light in different colors; and at least one processor, comprising processing circuitry, individually and/or collectively, configured to:

identify, from an image provided through the display, a specified region of interest preset to correspond to a type of the image, identify LED color information and LED brightness information corresponding to the plurality of LEDs based on red, green, blue pixel (RGB) grayscale data of pixels corresponding to the specified region of interest, obtain surrounding color information and surrounding brightness information of a surrounding environment based on sensing data obtained through the illuminance sensor and the color sensor, modify the LED color information and the LED brightness information based on the surrounding color information and a specified lighting mode, wherein the specified lighting mode is based on at least one from among a user command, a use history, or type of the image, and comprises at least one from among a contrast color mode or a similar color mode;

control a light emitting state of the plurality of LEDs based on the modified LED color information and the specified lighting mode; and modify a grayscale value of a specific color included in the surrounding color information differently according to whether the specified lighting mode is the contrast color mode or the similar color mode.

2. The display device of claim 1, wherein at least one processor, individually and/or collectively, is configured to:

obtain a gain value proportionate to the obtained surrounding brightness information, and modify brightness information by applying the obtained gain value to the brightness information corresponding to the plurality of LEDs.

3. The display device of claim 1, wherein at least one processor, individually and/or collectively, is configured to:

obtain, based on the obtained surrounding brightness information being identified as less than or equal to a first threshold value, a gain value for reducing brightness corresponding to the plurality of LEDs, and modify brightness information by applying the gain value to the brightness information corresponding to the plurality of LEDs.

4. The display device of claim 1, wherein at least one processor, individually and/or collectively, is configured to:

obtain, based on the obtained surrounding brightness information being identified as greater than or equal to a second threshold value, a gain value for increasing brightness corresponding to the plurality of LEDs, and modify brightness information by applying the gain value to the brightness information corresponding to the plurality of LEDs.

5. The display device of claim 1, wherein at least one processor, individually and/or collectively, is configured to:

in the contrast color mode, increase, based on a grayscale value of a specific color included in the surrounding color information being relatively lower than grayscale values of remaining colors, the grayscale value of the specific color corresponding to the plurality of LEDs, and reduce, based on the grayscale value of the specific color included in the surrounding color information being relatively higher than the grayscale values of the remaining colors, the grayscale value of the specific color corresponding to the plurality of LEDs.

6. The display device of claim 1, wherein at least one processor, individually and/or collectively, is configured to:

in the similar color mode, reduce, based on a grayscale value of a specific color included in the surrounding color information being relatively lower than grayscale values of remaining colors, the grayscale value of the specific color corresponding to the plurality of LEDs, and increase, based on the grayscale value of the specific color included in the surrounding color information being relatively higher than the grayscale values of the remaining colors, the grayscale value of the specific color corresponding to the plurality of LEDs.

7. The display device of claim 1, further comprising:

a memory which stores information on regions of interest for each content type, wherein at least one processor, individually and/or collectively, is configured to:

set, based on information associated with the content type being selected, a region of interest corresponding to the selected content type based on the information stored in the memory.

8. The display device of claim 7, wherein the information on regions of interest for each content type comprises information on different positions in the image for each content type, and the different positions in the image comprises at least one from among a center region, a left lower end region, or a right lower end region of the image.

9. A method of controlling a display device comprising a plurality of light emitting diodes (LEDs) configured to emit light in different colors, the method comprising:

identifying, from an image provided through the display, a specified region of interest preset to correspond to a type of the image, identifying LED color information and LED brightness information corresponding to the plurality of LEDs based on RGB grayscale data of pixels corresponding to the specified region of interest;

obtaining surrounding color information and surrounding brightness information of a surrounding environment based on sensing data obtained through a illuminance sensor and a color sensor;

obtaining surrounding color information and surrounding brightness information of a surrounding environment based on sensing data obtained through a illuminance sensor and a color sensor;

modifying the LED color information and the LED brightness information based on the surrounding color information and a specified lighting mode, wherein the specified lighting mode based on at least one from among a user command, a use history, or type of the image, and comprises at least one from among a contrast color mode or a similar color mode; and controlling a light emitting state of the plurality of LEDs based on the modified LED color information and the specified lighting mode, wherein the modifying comprises modifying a grayscale value of a specific color included in the surrounding color information differently according to whether the specified lighting mode is the contrast color mode or the similar color mode.

10. The method of claim 9, wherein the modifying the identified LED brightness information comprises:

obtaining a gain value proportionate to the obtained surrounding brightness information; and modifying brightness information by applying the obtained gain value to the brightness information corresponding to the plurality of LEDs.

* * * * *